Patented July 31, 1945

2,380,779

UNITED STATES PATENT OFFICE 2,380,779

METHOD OF PREPARING SODIUM PERBORATE OF LOW BULK DENSITY

Hugo Nees, Frankfort-on-the-Main, Germany; vested in the Alien Property Custodian No Drawing. Application September 1, 1939, Serial No. 293,101. In Germany September 3, 1938

11 Claims. (Cl. 23—60)

This invention relates to the preparation of sodium perborate of low bulk density. More particularly, it relates to the preparation of sodium perborate of bulk densities ranging from 100 to 200 grams per liter of volume, and to an improved process for preparing this relatively light and fluffy material.

The improved process for preparing this material in low bulk density involves reacting an aqueous solution of sodium hydroxide with an aqueous solution of borax and hydrogen peroxide in such a manner that the sodium perborate formed is maintained in a supersaturated condition in the liquid. The perborate is advantageously separated rapidly from the mother liquor and dried.

The solution of sodium hydroxide is preferably an aqueous solution containing, for example, about 200 grams of NaOH per liter. Sufficient of the solution is added to supply the amount of sodium hydroxide necessary to form sodium perborate by reaction with the borax present. The solutions are intermixed, at such a rate that it requires at least 5 minutes to add all of the one solution to the other. Preferably the solutions are intermixed at such a rate that from ½ to 2 hours is required. Any exceeding of 2 hours in the time required for adding one solution to the other does not result in appreciable improvement in the process or product.

By regulating the concentration of the solution of sodium hydroxide added to the solution containing borax and hydrogen peroxide, it is possible to influence the flowing ability of the sodium perborate being prepared. If relatively dilute solutions of sodium hydroxide are added, for example solutions containing approximately 40 grams of NaOH per liter, it has been observed that products having better pouring properties are secured than if the solution of sodium hydroxide is more concentrated. It is desirable to allow the solution containing borax and hydrogen peroxide to stand for a short period, for example from ¼ to 1 hour, after preparing this mixed solution. Improved results are also obtained by stirring the solution prior to introduction of the solution of sodium hydroxide.

The process is best carried out at temperatures below 30° C. and preferably temperatures between 5 and 15° C. are maintained. During the addition of one solution to the other the reaction mixture should be thoroughly stirred. Separation of the sodium perborate in the form of fine particles is favored or accelerated by energetic stirring.

The pH value of the solution containing borax and hydrogen peroxide, at the commencement of operations, is usually within the range 6.7 to 7.2, when the usual commercial hydrogen peroxide solution which is acid in reaction is employed. As the solution of sodium hydroxide is added thereto the pH value is gradually increased. After the addition of the greater part of the sodium hydroxide solution the pH value then increases rather rapidly, for example, to a pH value of approximately 9. The solution becomes cloudy during the step of adding the solution of sodium hydroxide until finally the main part of the sodium perborate precipitates spontaneously in the form of fine particles.

It is desirable not to keep the precipitated crystals of sodium perborate in contact with the mother liquor for too long a period. The process of drying this sodium perborate product should therefore be carried out rapidly in order to prevent undesirable increase in size, and coalescing or growing together of the crystals which, if it occurs, will increase the bulk density of the product.

By carrying out the process as described it is possible to prepare sodium perborate which, after separation from the mother liquor and thorough drying, possesses a bulk density of from 100 to 200 grams per liter of volume. It may be stated, for purposes of comparison that sodium perborate obtained by processes now known to the art, e. g. by the introduction of sodium metaborate into hydrogen peroxide solutions, usually possesses a bulk density falling approximately within the range 650 to 670 grams per liter. Bulk densities even higher than these given may often be secured with the manufacturing processes now known in the art.

The preparation of sodium perborate of low bulk density, or sodium perborate which is relatively light and fluffy, is promoted by having present in the reaction liquid salts or compounds which favor or bring about the formation of crystal nuclei. As examples of such salts may be mentioned alkali metal salts, such as sodium chloride, sodium carbonate, sodium nitrate, sodium acetate, and the corresponding salts of ammonium and potassium. Soluble salts of the alkaline earth metals as, for example, the salts of calcium and barium are also effective. Salts or compounds of the metals, magnesium, aluminium, zinc and cadmium have also been found very effective in promoting the formation of crystal nuclei. Metallic salts suitable are the soluble formates of the metals mentioned, the citrates, oxalates, benzoates, lactates, propionates and other salts of similar acids. It has been found that compounds such as the methyl ester of formic acid and similar esters are also valuable addition agents. Two or more compounds or salts promoting the formation of a plurality of small crystals may be added to the reaction liquor. The amount of addition agent is so regulated that the solution is unsaturated with respect to this agent. Usually from ½ mole to 3 moles of the addition compound or addition salt per mole of borax are added. When adding salts or compounds of the metals magnesium, calcium, barium, and the other alkaline earth metals, or of aluminium, zinc, cadmium and similar metals, it is desirable to introduce but relatively small amounts of the addition agent or compound.

The alkali necessary for the formation of sodium perborate from borax can, if necessary, be added to the solution either in part or in whole by compounds which supply sodium ions such as soda (sodium carbonate), trisodium phosphate and similar compounds.

If desired, a portion of the hydrogen peroxide, for example up to about one-quarter of the total amount of hydrogen peroxide necessary, may be added to the reaction mixture in the form of sodium peroxide. All of the alkali may be added to the reaction mixture in the form of this compound if desired.

The process is advantageously carried out by having present during the reaction a stabilizing agent such, for example, as magnesium silicate. This may be incorporated in the solution of borax and hydrogen peroxide before addition of the alkali thereto.

As examples of my improved process for the manufacture of sodium perborate of relatively light weight and low bulk density, the following may be given:

Example I 477 g. of borax was dissolved in 6500 cc. of water at a temperature of 40° C. The solution was thoroughly stirred during the dissolving operation. After cooling the resulting solution, 348 g. of crystalline sodium acetate, 450 cc. of hydrogen peroxide solution (40% by volume concentration) and 22 cc. of a magnesium silicate in water suspension were added to the solution of borax. Upon the addition of hydrogen peroxide the solution of borax became completely clear. Its pH value was approximately 6.8

The resulting solution was allowed to stand for ½ hour during which period it was cooled to 10° C. A solution of sodium hydroxide containing 100 grams of NaOH in 500 cc. of water was then allowed to run in, the solution being added at such a rate that from 35 to 60 minutes was required for its complete addition. The temperature was maintained within the range 10 to 15° C. during the addition of the sodium hydroxide solution. During the entire time the solution was vigorously stirred with a high-speed rotating stirrer operating at from 3 to 5 revolutions per second.

Upon the addition of the solution of sodium hydroxide the pH value of the reaction mixture slowly increased. After approximately 15 minutes it attained a value of about 7, whereupon the solution became cloudy as the result of the precipitation of sodium perborate therein. After the addition of the sodium hydroxide solution for 10 minutes more, the greater part of the sodium perborate precipitated, the pH value of the solution increased very rapidly, and the liberation of considerable heat was noticed. After addition of all of the sodium hydroxide solution the solution was stirred for 20 minutes longer. It was then subjected to centrifuging in order to recover the precipitated salt. The salt was washed with water. After the product was dried in air and then subjected to further drying in a heated chamber under reduced pressure, there was obtained approximately 655 grams of sodium perborate. This product was of excellent stability and had a bulk density ranging from 100 grams per liter to 150 grams per liter. The yield of perborate was 85% of the theoretical. The mother liquor was then further utilized for the production of further amounts of sodium perborate by replenishing its active constituents and introducing thereinto further amounts of the sodium hydroxide solution.

Example II

A solution of 477 g. of borax in 6500 cc. of water was prepared. This solution was then cooled to 15° C., whereupon there was introduced thereinto magnesium silicate in aqueous suspension and 450 cc. of hydrogen peroxide solution (40% by volume concentration).

To the resulting solution there was then added 135 g. of soda (sodium carbonate), the addition being carried out in small increments while the solution was subjected to thorough stirring. After approximately 20 minutes the solution became cloudy due to the precipitation of sodium perborate therein. During the precipitation of the product the solution was cooled to 10° C. It required approximately 40 minutes for the complete addition of all of the soda.

After standing for a period of approximately forty minutes longer, during which as during the step of adding the soda to the reaction mixture it was subjected to vigorous stirring, the sodium perborate was filtered using a suction filter and freed of mother liquor. It was then washed with 3 liters of water and dried. At the conclusion of the drying step there was obtained about 420 grams of sodium perborate which had a bulk density of from 150 to 180 grams per liter of volume. The mother liquor was recovered, replenished by the addition of necessary agents, and reutilized for the preparation of further amounts of sodium perborate.

The foregoing details, procedures, temperatures, percentages and amounts, which have been given merely as illustrative of the preferred process, are not to be regarded as restrictive except as necessitated by the prior art and appended claims. Various changes might be made in the details of the invention as described which would come within the scope of the invention. Accordingly the scope is to be determined, not solely by details given in description of the preferred procedures, but in accordance with the prior art and the claims.

I claim:

1. A process for preparing sodium perborate of low bulk density which comprises adding to a solution of hydrogen peroxide and borax a solution of an alkaline sodium compound selected from the group which consists of sodium hydroxide, sodium carbonate, trisodium phosphate, and sodium peroxide, said solution being added at such a rate that a supersaturated solution of sodium perborate results, removing the precipitated sodium perborate from the mother liquor, and drying the resulting product.

2. A process for preparing sodium perborate of low bulk density which comprises adding an aqueous solution of sodium hydroxide to an aqueous solution containing borax and hydrogen peroxide, said solution of sodium hydroxide being added at such a rate that a supersaturated solution of sodium perborate results, and then recovering said sodium perborate from the mother liquor.

3. A process for preparing sodium perborate of low bulk density which comprises adding a solution of sodium hydroxide to an aqueous solution of borax and hydrogen peroxide containing a stabilizing agent, said solution of sodium hydroxide being added at such a rate that a supersaturated solution of sodium perborate results, rapidly removing the sodium perborate from the mother liquor, and drying said recovered sodium perborate.

4. A process for preparing sodium perborate of low bulk density which comprises adding an aqueous solution of sodium hydroxide to an aqueous solution of hydrogen peroxide and borax at such a rate that a supersaturated solution of sodium perborate results, said reaction being carried out at a temperature below 30° C.

5. A process for preparing sodium perborate of low bulk density which comprises adding an aqueous solution of sodium hydroxide to an aqueous solution containing borax and hydrogen peroxide at such a rate that a supersaturated solution of sodium perborate results, maintaining the temperature of the reaction mixture between 5 and 15° C. during said reaction, and subjecting said reaction mixture to continued stirring.

6. A process for preparing sodium perborate of low bulk density which comprises adding a solution of sodium hydroxide to a solution of borax and hydrogen peroxide at such a rate that a supersaturated solution of sodium perborate results, said sodium hydroxide addition requiring a period of time ranging from five minutes to two hours, rapidly removing the formed sodium perborate from the reaction mixture, and drying said desired product.

7. A process for preparing sodium perborate of low bulk density which comprises adding a solution of sodium hydroxide containing approximately 40 grams of sodium hydroxide per liter of solution to an aqueous solution of borax and hydrogen peroxide, said dilute solution of sodium hydroxide being added at such a rate that a supersaturated solution of sodium perborate results, rapidly removing the precipitated sodium perborate from the mother liquor, and drying the desired product.

8. A process for preparing sodium perborate of low bulk density which comprises preparing an aqueous solution of borax and hydrogen peroxide, permitting said solution to stand for a period of time ranging from one quarter hour to one hour, during which time said solution is thoroughly stirred, adding thereto a solution of sodium hydroxide at such a rate that a supersaturated solution of sodium perborate results, removing the precipitated sodium perborate from the mother liquor, and drying the resulting product.

9. A process for preparing sodium perborate of low bulk density which comprises adding an aqueous solution of sodium hydroxide to an aqueous solution containing borax and hydrogen peroxide at such a rate that a supersaturated solution of sodium perborate results, whereby the concentration, the pH value and the temperature of the reaction mixture are controlled in such a manner that a number of fine crystals is formed.

10. A process for preparing sodium perborate of low bulk density which comprises adding to an aqueous solution of hydrogen peroxide and borax an aqueous solution of sodium carbonate, said aqueous solution of sodium carbonate being added at such a rate that a supersaturated solution of sodium perborate results, removing the precipitated sodium perborate rapidly from the mother liquor, and drying the resulting product.

11. A process for preparing sodium perborate of low bulk density which comprises adding to a solution of borax and hydrogen peroxide a solution of trisodium phosphate, said solution of trisodium phosphate being added at such a rate that a supersaturated solution of sodium perborate results, removing the precipitated sodium perborate rapidly from the mother liquor, and drying the resulting product.

HUGO NEES.